United States Patent
Fieau et al.

(10) Patent No.: US 12,244,644 B2
(45) Date of Patent: Mar. 4, 2025

(54) METHODS AND DEVICES FOR MEASURING REPUTATION IN A COMMUNICATION NETWORK

(71) Applicant: ORANGE, Issy-les-Moulineaux (FR)

(72) Inventors: Frédéric Fieau, Chatillon (FR); Emile Stephan, Chatillon (FR); Gaël Fromentoux, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 310 days.

(21) Appl. No.: 17/607,289

(22) PCT Filed: Apr. 29, 2020

(86) PCT No.: PCT/EP2020/061822
§ 371 (c)(1),
(2) Date: Oct. 28, 2021

(87) PCT Pub. No.: WO2020/221779
PCT Pub. Date: Nov. 5, 2020

(65) Prior Publication Data
US 2022/0217179 A1     Jul. 7, 2022

(30) Foreign Application Priority Data
Apr. 30, 2019   (FR) .................................... 1904585

(51) Int. Cl.
*H04L 9/40*       (2022.01)
*H04L 45/00*      (2022.01)

(52) U.S. Cl.
CPC .............. *H04L 63/20* (2013.01); *H04L 45/14* (2013.01); *H04L 45/20* (2013.01)

(58) Field of Classification Search
None
See application file for complete search history.

(56) References Cited

U.S. PATENT DOCUMENTS

| | | | |
|---|---|---|---|
| 7,716,367 B1 * | 5/2010 | Leighton | H04L 61/4511 709/244 |
| 2016/0315921 A1 * | 10/2016 | Dara | H04L 69/166 |
| 2018/0048668 A1 * | 2/2018 | Gupta | H04L 63/1425 |
| 2018/0367445 A1 * | 12/2018 | Bajaj | H04L 41/40 |

OTHER PUBLICATIONS

English translation of the Written Opinion of the International Searching Authority dated Jun. 24, 2020 for corresponding International Application No. PCT/EP2020/061822, filed Apr. 29, 2020.

(Continued)

*Primary Examiner* — William J. Goodchild
(74) *Attorney, Agent, or Firm* — David D. Brush; Westman, Champlin & Koehler, P.A.

(57) ABSTRACT

A method for measuring reputation of paths visiting nodes in a communication network and including, for each node visited by a current path of the network: a) assigning a security score for the node; b) estimating a first trust index based on: a cumulative on the current path of the successive scores of the nodes visited by the current path; and a number of nodes visited by the current path, the estimation of the first trust index providing a reputation measurement for the current path.

15 Claims, 3 Drawing Sheets

(56) References Cited

OTHER PUBLICATIONS

International Search Report dated Jun. 16, 2020 for corresponding International Application No. PCT/EP2020/061822, Apr. 29, 2020.
Written Opinion of the International Searching Authority dated Jun. 16, 2020 for corresponding International Application No. PCT/EP2020/061822, filed Apr. 29, 2020.
Zhaoyu Liu et al, "A dynamic trust model for mobile ad hoc networks", Distributed Computing Systems, 2004. Proceedings. FTDCS 2004. 10th IEE E International Workshop on Future Trends of Suzhou, China May 26-28, 2004, Piscataway, NJ, USA, IEEE, May 26, 2004 (May 26, 2004), p. 1-6, XP010712148.
Francesco Oliviero et al, "A Reputation-Based Metric for Secure Routing in Wireless Mesh Networks", 2014 IEEE Global Communications Conference, Nov. 1, 2008 (Nov. 1, 2008), p. 1-5, XP055664547.

\* cited by examiner

METHODS AND DEVICES FOR MEASURING REPUTATION IN A COMMUNICATION NETWORK

CROSS-REFERENCE TO RELATED APPLICATIONS

This Application is a Section 371 National Stage Application of International Application No. PCT/EP2020/061822, filed Apr. 29, 2020, the content of which is incorporated herein by reference in its entirety, and published as WO 2020/221779 on Nov. 5, 2020, not in English.

BACKGROUND OF THE INVENTION

This disclosure relates to the exchange of data in a communication network. More specifically, aspects of this disclosure relate to methods and devices for measuring the reputation of elements in a communication network.

Today, the fields of transportation, media, health, and industrial production are expected to be major users of the future 5G standards in telecommunications. Consequently, the processes for data transmission must satisfy sufficiently strict certification and security conditions to guarantee the reliability of the routing of the exchanged data streams.

This is of crucial importance in particular for the collection, storage, transport, and analysis of sensitive data, for example data from connected objects, social networks, personal terminals, industrial devices, or shared management tools.

In this context, traffic engineering solutions are currently known for controlling and regulating the transmission of data in a communications network.

For example, methods are known for controlling the transmission of data as it reaches end nodes of a network. Certain methods, such as segment routing or SFC (Service Function Chaining), allow specific instructions to be put in place to guarantee the correct routing of data to a specific destination.

However, and although they allow ensuring a relative reliability of data traffic in a network, these solutions do not allow indicating or preventing failures of elements in a network. For example, malicious software attacks on network nodes or unauthorized access to routers can affect the integrity of data exchanged over a network that is considered reliable as a whole.

In particular, one disadvantage of known solutions is that they do not allow obtaining reputation information from particular elements within a communication network. It is thus impossible to determine exactly which nodes and/or which paths taken in a network may be compromised during a data exchange.

For example, a data packet intended to travel through a predetermined sequence of routers in a network may be intercepted and modified by a third-party device at an intermediate node before reaching a destination device.

Knowledge of information about the network reputation as a whole is insufficient for precisely locating a node whose reliability may have been compromised, and for taking appropriate corrective action.

In addition, the detection and analysis of failures can usually only be done after the data exchange is complete.

Another disadvantage is that, quite often, separate networks are used together to transmit data. The nodes of a network may also be operated by different parties, and are therefore not subject to the same security rules. However, strict cooperation between several parties complicates compliance with uniform routing and control rules.

This therefore reduces the reliability of the transmission of data exchanged through networks administered by multiple operators.

OBJECT AND SUMMARY OF THE INVENTION

In order to improve the situation and to counter this or these disadvantages, a method is proposed, in a general manner, for measuring the reputation of paths visiting nodes in a communication network, and comprising, for each node visited by a current path of the network:
a) an assignment of a security score for this node;
b) an estimation of a first trust index based on:
  a cumulative calculation on said current path of the successive scores of the nodes visited by the current path; and
  a number of nodes visited by the current path,
the estimation of said first trust index providing a reputation measurement for the current path.

Herein, a reputation measurement is defined as a value quantifying the reliability of a network element during a data transmission. One example is a network node, configured to transmit signal streams to and from another node.

Herein, a cumulative calculation of successive security scores is defined as a mathematical function of these scores. Such a function is, for example, a summation of scores, said summation possibly being weighted or distributed over some or all of the nodes visited by a current path.

The method thus makes it possible to determine the reputation of a path taken by a data packet over several nodes of a network.

Several reputation measurements makes it possible to compare the reliability of paths taken during the transmission of data in a communication network, for example in order to modify its architecture and thus increase the security of subsequent transmissions.

In one embodiment, said number of nodes is a value from a function selected among: a function of at least one field of a packet exchanged on the current path, a function of at least one connection time value of a packet exchanged on the current path, and a function of a number of encapsulations of a packet exchanged on the current path.

Herein, a field of a packet exchanged on a current path can take many diverse forms. For example, a field of a packet is composed of a number of bits indicating the address of origin of the packet or its destination address. Similarly, a field of a packet may indicate the version of the protocol used to transmit the data.

Advantageously, the field of a packet can be used to determine the number of nodes visited by this packet over time.

According to one example, connection time values of a packet exchanged on a current path can be used. Herein, a connection time corresponds to a TTL value ("Time-to-Live") which indicates the time during which a piece of information is kept. Typically, a TTL value is placed in a field or in a header of a data packet and indicates the number of seconds it is allowed to transit through the various nodes along its route.

In another example, a stack of headers in a field of a data packet can be used to determine the number of nodes used by a current path. In particular, provision can be made for the packet to have one or more headers unstacked when the packet is received by a given node of the network.

According to yet another example, a number of nodes can be a function of a number of encapsulations of a packet, said encapsulations corresponding to different levels of inclusion of the data according to one or more protocol(s) distinct from the packet protocol.

In one embodiment, said function comprises a calculation based on a predetermined value of a field of a packet and a current value.

Alternatively, the function comprises a calculation based on a predetermined value of the number of encapsulations of the packet and a current value.

For example, an initial TTL value of a packet defines a maximum number of nodes through which the packet can travel; this value can be decremented each time the packet is received by a given node of the network.

Thus, by making a difference between a current TTL value of a packet arriving at a node of a network and the initial TTL value of this packet, it is possible to determine the number of nodes through which this packet has traveled.

According to another example, when the number of nodes is a value from a function of a field of a packet exchanged on the current path, we can determine the number of nodes used by a current path by finding the difference between a current number of headers and an initial number of headers of a given packet. It is thus possible to determine the number of nodes through which this packet has traveled.

Advantageously, headers of a given type can be used, for example headers comprising a specific tag. By comparing the current structure and the initial structure of a stack of given headers, more precise information about the path used by a data packet in a network can be determined.

In one embodiment, the method further comprises, for an intermediate node of the network visited by at least one path:
c) an estimation of a second trust index based on a summation of at least a first trust index, said summation being weighted by the number of paths visiting said intermediate node.

An additional trust index can thus be estimated, giving a reputation measurement for a node of a network. This not only makes it possible to determine reputation information for one or more paths passing through a given node in a given communication network, but also, by extension, to determine reputation information for specific nodes in that network.

In addition, the determination of trust indices and/or reputation measurements can be repeated over time in order to update the reputation of nodes and paths comprised in a network.

In one embodiment, the security score of a node is determined based on a prior installation of a computer security application at that node.

The nodes are thus further protected against software attacks or unauthorized access.

In one embodiment, the estimation of the first trust index is implemented upon receipt of a packet by a node of the network to which a score has been assigned.

Such an embodiment thus makes it possible to determine, in a dynamic or ad hoc manner, the reputation of a path or of an intermediate node of a network during the actual transmission of a data packet in this network.

In one embodiment, the method further comprises a transmission of a message comprising said reputation measurement, to a node of the network and/or to a device connected to a node of the network.

This thus makes it possible to share and/or store in a memory of a third-party device a reputation measurement which can subsequently be used.

For example, when the reputation measurement is communicated to an end node of the network, the message can act as a notification to trigger an action such as data packet rejection, tagging, etc.

Similarly, a reputation measurement can be communicated to a device, for example a device belonging to the network operator. The operator can thus be encouraged to modify the traffic rules in the network, to modify the configuration of certain existing nodes or paths, or to update a record of previously measured reputations.

In one embodiment, the security score comprises at least a proof of transit.

Herein, proof of transit can take many diverse forms. In a non-limiting manner, proof of transit is a means of providing security for a transmission of data packets in a communication network. Various forms of proof of transit are described below.

As a general rule, proof of transit involves the addition of a portion of operational data to data packets traveling through selected nodes of the network. To ensure that these packets have indeed traveled through the selected nodes, the operational data are updated at each reception at one of the nodes. This update can be done either by a node or by a device external to the network. These data can be used at the end of a given path of nodes to verify that the packet has passed through all the nodes in the predetermined sequence.

In one particular embodiment, a reputation measurement for a path using nodes in a network is obtained by estimating a ratio between a cumulative calculation, on this path, of proofs of transit associated with the nodes used by the current path and a function of the connection time of a packet transmitted on this path.

This ratio thus provides a reputation measurement for the path which allows precise identification of the number of nodes which were not assigned a security score, and for example did not contribute to the proof of transit.

In addition, this allows locally detecting which nodes may possibly have led to data irregularities or transit errors.

In one embodiment, the method further comprises a selection, in the network, of a path between two end nodes, based on a better reputation among the reputations respectively estimated for a plurality of current paths in the network.

This optimizes the reliability of a data transmission over the network by preventing transmitted data packets from taking paths of lower reputation.

In one embodiment, the current path visits two end nodes of the network, among which are a first end node connected to a user device and a second end node connected to a server.

Thus, such an embodiment makes it possible to exchange data packets between a user device and a server, along a path whose reputation is measurable.

In particular, this makes it possible to determine precisely whether or not data packets have traveled through a series of intermediate nodes between two end nodes of these types.

In one embodiment, the method is implemented by at least one controller of a network, configured for:
  assigning a security score to a node of said network; and/or
  estimating at least a first trust index for a node visited by a current path of the network.

This makes it possible to centralize or decouple the configuration of nodes in a network from the collection of trust indexes, by means of a device provided for this purpose.

In one embodiment, the method is implemented by a plurality of controllers.

It is thus possible to implement the method by means of separate controllers, one for example being configured solely for assigning security scores and the other being configured solely for estimating a trust index. In addition, this makes it possible to implement the method by means of controllers of separate networks, and in particular of networks belonging to different operators.

In one embodiment, the selection of a path for transmitting a data packet over the network is performed by means of an IGP ("Interior Gateway Protocol"), which is a routing protocol specific to autonomous systems.

When used in combination with one of the preceding embodiments, an IGP protocol improves the establishment of optimal routes between several nodes of a network, and in particular between nodes selected among all available destinations of an autonomous system. For example, one can sum the reputation measurements performed by each of a plurality of controllers, or integrate several reputation measurements into the IGP protocol.

The invention also relates to a network controller device comprising a processing circuit configured for implementing the method according to one of the preceding claims.

The invention also relates to a computer program comprising instructions for implementing the method according to the invention, when these instructions are executed by a processor of a processing circuit.

BRIEF DESCRIPTION OF DRAWINGS

Other features, details, and advantages will be apparent from reading the detailed description below, and from analyzing the accompanying drawings, in which.

Unless otherwise indicated, common or similar elements in different figures bear the same reference symbols and have identical or similar characteristics, so these common elements are generally not described again for the sake of simplicity.

DESCRIPTION OF EMBODIMENTS

The drawings and following description for the most part contain elements that are definite in nature. Therefore not only can they serve to provide a better understanding of this disclosure, but they also contribute to its definition, where appropriate.

Figure 1:
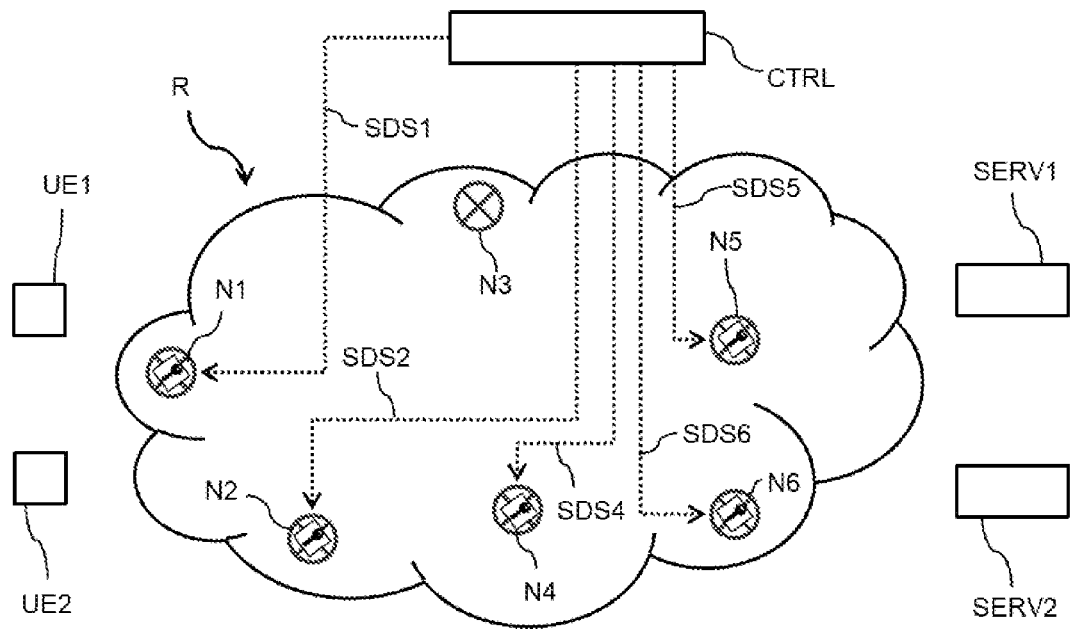
FIG. 1 represents a schematic view of an environment of a communication network according to one exemplary embodiment.

Reference is now made to FIG. 1, which represents a communication network R for implementing a data transmission service.

In a non-limiting manner, the example of a transmission of one or more data packets according to a specific communication protocol will be used here, for example for an exchange of data on the Internet or via a 5G standard.

Herein, the data packets are packets which follow an Internet protocol, known as IP ("Internet Protocol") packets, user datagram packets, known as UDP ("User Datagram Protocol") packets, packets of a transmission control protocol, known as TCP ("Transmission Control Protocol") packets, or of an Internet control message protocol, known as ICMP ("Internet Control Message Protocol") packets.

In the following examples, the example of IP packets will be considered. The transmission of an IP packet over the network defines a current path comprising a number of nodes.

In a configuration first step, a controller CTRL configures a plurality of nodes in the network R to assign them a security score.

In one embodiment, and with no loss of generality, the security score is considered here to include at least one proof of transit SDS. Thus the nodes are distinguished as N1, N2, N4, N5 and N6, referred to as "routers SDS", and respectively comprising proofs of transit SDS1, SDS2, SDS4, SDS5, and SDS6, from node N3 which is a router not comprising a proof of transit. For example, node N3 is a router that does not belong to the same operator as that of the controller CTRL.

In one embodiment, a proof of transit SDS, when it is received by another router SDS during transmission of a data packet, can be modified by this router SDS and will successively correspond to value SDS(N1) of the proof, value SDS(N1, N2) of the proof, etc. The proof SDS thus keeps track of its passage through the successive nodes N1, N2, etc.

In one embodiment, a security score or a proof of transit comprising the security score results from a calculation of a mathematical function, for example coefficients of a polynomial of degree N.

In one embodiment, this polynomial is a Lagrange polynomial.

Herein, the assignment of security scores to the nodes of R can be done as follows: a controller CTRL assigns to these nodes a value "Ci" of a coefficient of degree "i" of a polynomial "Pn" of degree "n", the numbers "l" and "n" being positive integers. "Pn" is for example defined by the polynomial $Pn(X1, X2, \ldots, Xn) = C0 + C1.X1 + C2.X2 + \ldots Cn.Xn$. Thus the value of coefficient "C1" corresponds to node N1, the value of coefficient "C2" corresponds to node N2, and so on.

In particular, each node can be configured by the controller CTRL to add the value of its coefficient to the summation calculated each time a packet travels through it, and to add the value of a coefficient of the polynomial in a field of the packet. It is thus possible to configure a communication network so that several nodes have some information about the polynomial function P, but never all of it.

Although a given node is assigned a given coefficient, the controller CTRL keeps the other coefficients secret. When a packet is exchanged over the network and travels through the set of nodes N1, N2, . . . , Nn, the sum of the coefficients C1, C2, . . . , Cn defining part of a proof of transit can thus be calculated step by step, which defines a cumulative calculation.

Herein, an end node of a network can comprise any device for communicating with a component, such as a computer, a server, a user terminal, a router, a host gateway, another network, etc.

In the present case, the network R comprises several egress end nodes, in particular two nodes N5 and N6, node N5 being able to be connected to a first server SERV1 and node N6 being able to be connected to a second server SERV2.

To distinguish them from nodes belonging to the network, called intermediate nodes or routers, devices and servers outside the network R are referred to herein as end nodes.

In one embodiment, a cumulative calculation, on a path, of successive security scores of a set of nodes visited by this path is calculated by an intermediate node.

Herein, a cumulative calculation can take many diverse forms. For example, when a packet travels through an intermediate node of the network, the node may be configured to calculate or communicate to the controller CTRL the cumulative calculation $CML=(CML0+(PN1+PN2).LPC).PP$, where $CML0$ is the value of a cumulative calculation by the previous node, PN1 is the value of the first polynomial P1 at this intermediate node, PN2 is the value of the second polynomial P2 at this intermediate node, LPC is a predetermined constant, and PP is a prime number defined and communicated to all nodes, for example by the controller CTRL.

Thus, the cumulative calculation CML is updated at each packet exchange from one node to another node.

In one embodiment, the controller, an end node, and/or an intermediate node is configured to access all of the assigned scores, for example the value of the polynomial "Pn" at a given node. It is thus possible to verify the integrity of the data transmitted for a given packet, which can for example be carried out upon receiving the sum for the polynomial Pn calculated by a succession of previous nodes and comparing this sum with a known control value of the controller, end node, and/or intermediate node.

In one embodiment, the controller CTRL and/or at least one end node of the network is configured to verify, at the end of the packet exchange over the network, that the cumulative calculation corresponds to a predetermined cumulative calculation.

In one embodiment, a security score comprises two mathematical functions, a first polynomial P1, called a secret polynomial, and a second polynomial P2, called a public polynomial. The coefficients of the secret polynomial are initiated by the first node through which the packet travels. Either of these two polynomials can serve as a proof of transit SDS.

In one embodiment, the coefficients of P1 and P2 are integers chosen at random. At least one coefficient of the first polynomial P1 can be secret and/or constant. The second polynomial P2 can be public and its coefficients can be chosen differently from those of P1 or when transmitting different packets. For example, P1 is a polynomial whose value for the coefficients remains constant but the entirety of the values is not known by the nodes, while the values of the coefficients of P2 are known by each node but are specific to the transmission of a given packet.

Advantageously, the use of several polynomials makes it possible to prevent their coefficients $C_i$ from being inferred by a third-party device during access to a node of the network, for example during the temporary absence of a node of the path during modification of the architecture of the network R or a voluntary or involuntary rerouting of data packets.

In one exemplary embodiment, the values of the coefficients of at least one polynomial, preferably polynomial P2, can be calculated by one or more nodes of the network and added to P1. Alternatively, the cumulative calculation, i.e. a result of the summation at each network node, can be added to the packet, for example in a field of the packet.

For example, an egress end node can be configured to determine a third polynomial P3 based on the coefficients obtained by a packet having traveled through a succession of nodes along a given path. The polynomial P3 can then be compared to the first polynomial P1 provided by the controller CTRL in order to verify that the packet has been transmitted via network nodes along a predefined path. If the packet did not take this path, a difference will appear between P1 and P3 when they are compared.

The above description uses a proof of transit based on Lagrange polynomials. The method also applies to any other process for establishing proofs of transit.

Figure 2:
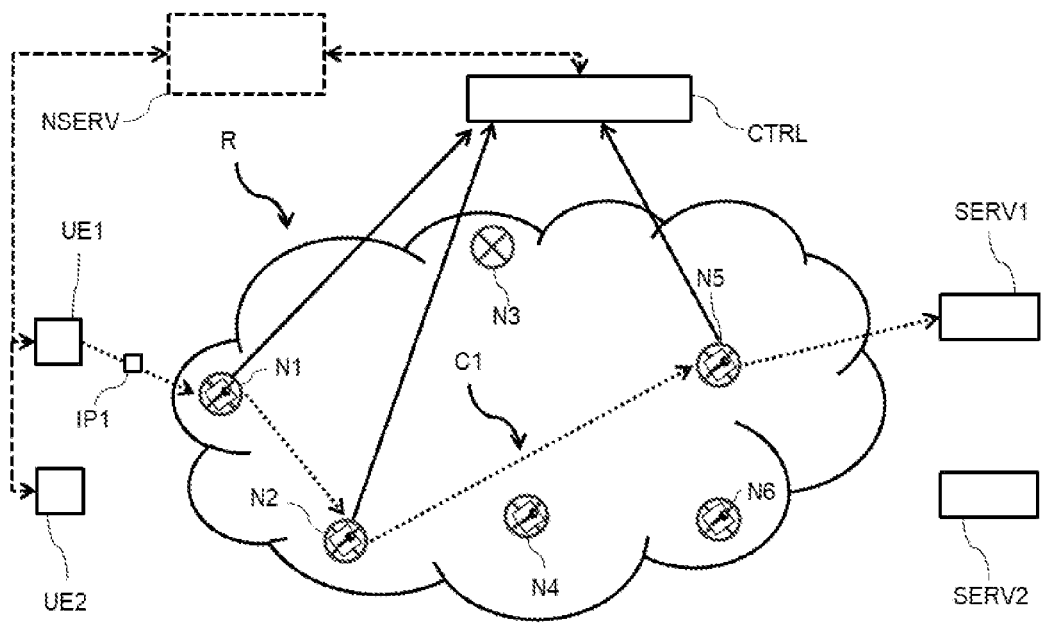
FIG. 2 represents one exemplary embodiment for a first path in a network.
Figure 3:
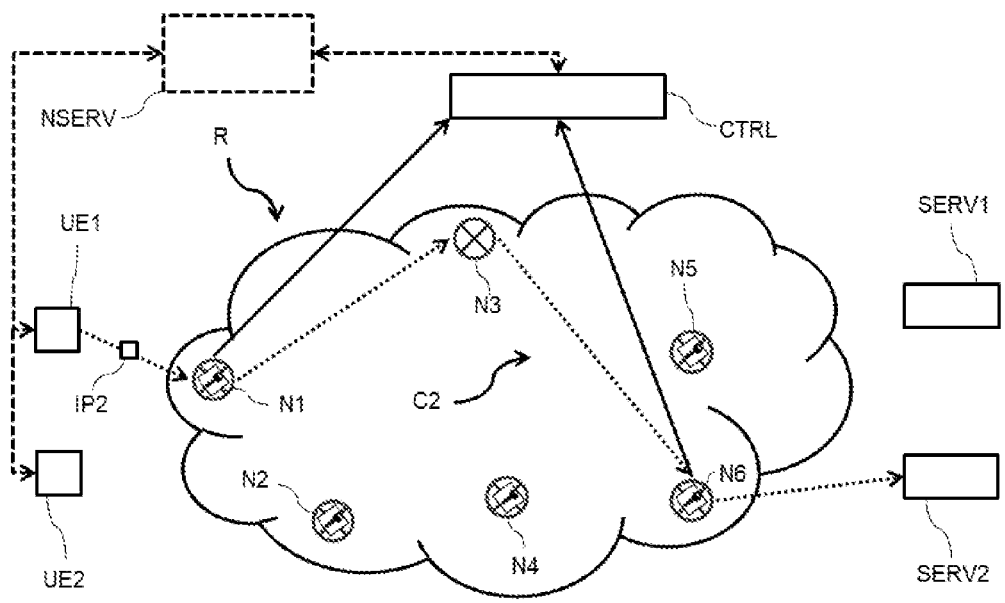
FIG. 3 represents one exemplary embodiment for a second path in a network.
Figure 4:
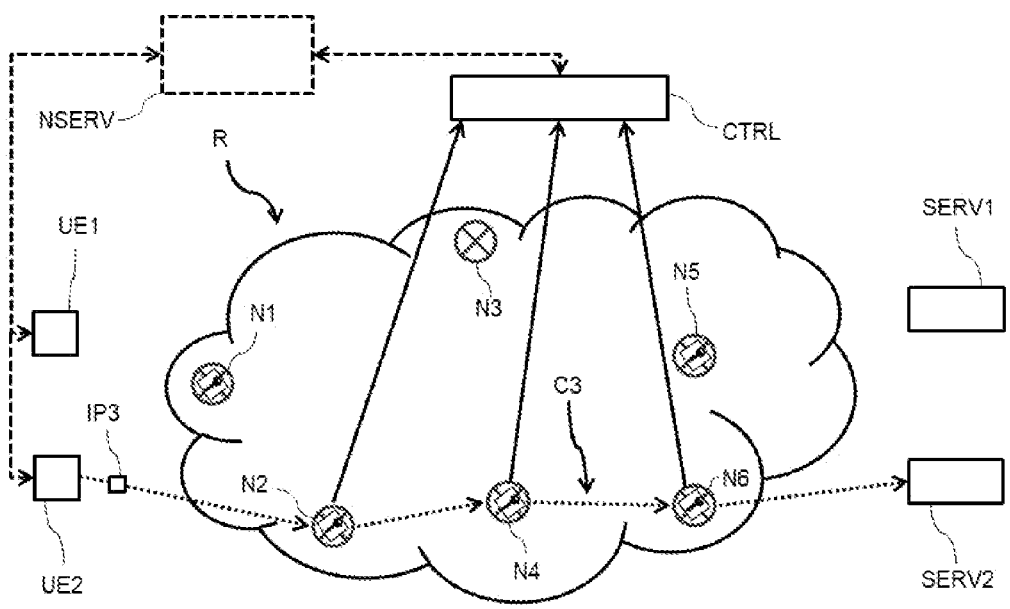
FIG. 4 represents one exemplary embodiment for a third path in a network.

Referring now to FIGS. 2, 3, and 4, a schematic representation of paths using nodes in a communication network R is given for various simplified scenarios.

In particular, they illustrate the general case of data packets exchanged between a user device UE1 or UE2, for example terminals, and at least one server SERV1 and SERV2, via nodes of the network R.

A data packet can be transmitted from a user device to a network R via end nodes, and in particular ingress end nodes N1 and N2.

Herein, an ingress node is any network access node that hosts a function for routing over a path that can be established between a user device and a server.

For example, it may be a subscriber access node, a DSLAM ("Digital Subscriber Line Access Multiplexer"), or a PoP (Point of Presence") router.

In one embodiment, a packet comprises a connection time parameter, also called the time-to-live or TTL parameter.

In particular, a "Traceroute" type function makes it possible to send UDP, TCP, or even ICMP packets having an increasingly small TTL parameter. When issued by a user device, the TTL parameter is initialized to a given value, for example a number of bits equal to 255, then decremented with each passage through a node of a network.

In addition, a "Traceroute" function makes it possible to identify the nodes used, to indicate the transmission delay between each of the nodes, and to identify possible loss of packets. This information allows diagnosing routing problems, congestion, or errors in the general architecture of the network R.

For example, each node comprises a routing table from which it determines the next destination node of the packet. Thus, node N1 can comprise a routing table that specifies sending packet IP1 to node N2 in the case of path C1, but also specifies a possible sending to node N3 under other conditions.

In one embodiment, the controller CTRL configures at least one ingress node of the network R to assign an initial TTL value to a packet. Each node of the network subsequently receiving this packet is configured to decrement the current TTL value before transmitting it. When the TTL value of this packet reaches 0, the node sends an error message to indicate that the time-to-live of the packet has expired, resulting for example in stopping the transmission of this packet on the network R.

In one embodiment, a controller CTRL communicates the TTL value(s) to the routers SDS of the network R during the configuration first step. The controller may also configure each router SDS to follow a specific rule for decrementing the TTL value of a packet IP as it passes through a router SDS. When transmitting a packet, this allows an intermediate node configured as a router SDS to calculate a number of nodes visited by a given packet.

In FIG. 2, a packet IP1 is routed from a user device UE1 to reach server SERV1 by taking path C1, said path C1 passing successively through nodes N1, N2, and N5.

In the present case, and unlike node N3, nodes N1, N2, N4, N5, and N6 are routers SDS configured and controlled by the controller CTRL. A security score has been assigned to each router SDS, each router being able to read and calculate a proof of transit SDS of a packet and to modify a field SDS of said packet.

In one embodiment, and in general, at least one controller CTRL is configured to perform an action among: the configuration of nodes of a network, for example assign them a security score such as a proof of transit SDS, receive and read a proof of transit SDS of a packet IP passing through one of these nodes, and/or determine one or more trust indices, for example with a view to estimating a reputation measurement for a node or path of the network R.

In one embodiment illustrated in the figures, at least one controller CTRL of the network R is connected to a notification server NSERV.

The notification server NSERV is connected to at least one user device, for example UE1 and/or UE2, which originated the transmission of a packet IP on the network R. Alternatively, it is equally possible for the notification server NSERV to be connected to any device connected to an end node of the network.

In one embodiment, the notification server NSERV is configured to notify one or more user devices of information acquired by the controller CTRL. For example, this makes it possible to share a value of a trust index and/or a reputation measurement for an element of the network R, with the users of the devices UE1 and/or UE2.

In one embodiment, at least one controller is configured to implement a collection second step. This second step comprises at least a first sub-step aimed at estimating a reputation measurement for a current path, and/or a second sub-step aimed at estimating a reputation measurement for a node of the network R.

In one embodiment (not shown), at least two network controllers CTRL and CTRL2 are configured to implement the invention. For example, at least one controller is configured to assign a security score to at least one node of the network R and at least one other controller is configured to estimate at least one trust index. The controllers CTRL and CTRL2 may also be configured to interact with different elements within a same network.

In FIG. 3, and in a similar manner, terminal UE1 sends over the network R a data packet IP2 intended for a server SERV2 distinct from server SERV1, and connected to the network R via node N6. Packet IP2 enters the network R via ingress node N1 then takes path C2 corresponding to the succession of nodes N1, N3, and N6, before reaching server SERV2 via end node N6.

In FIG. 4, and similarly, a terminal UE2 distinct from UE1 sends over the network R a data packet IP3 intended for server SERV2. Packet IP3 enters the network R via node N2 and takes path C3 corresponding to the succession of nodes N2, N4, and N6 before reaching server SERV2.

In the figures illustrating the transmissions of packets IP1, IP2, and IP3, the controller CTRL collects, from the nodes visited by them, the current TTL values and the current security score values in order to estimate one or more trust indices. This collection, comprised in the second step, is illustrated by arrows linking the nodes to the controller CTRL.

On the basis of these figures, a calculation of a first trust index I1 can be performed in order to obtain a reputation measurement for the paths taken.

In a simplified embodiment, the value of a security score assigned to a node, or the value of a proof of transit SDS comprised in this security score, is considered here to be equal to "1". If a node, for example N3, has not been assigned a security score by CTRL, this value is considered to be equal to "0".

For path C1, each of the nodes N1, N2, and N5 visited has a security score of "1". One can therefore estimate a first trust index I1 corresponding to C1 as being the cumulative calculation, i.e. the summation, of the successive scores of the nodes visited by C1, divided by the total number of nodes, i.e. I1(C1)=3/3=1, which amounts to giving path C1 a reputation measurement equal to 100%. The total number of nodes here is for example deduced from the difference between the final TTL value of packet IP1 and the initial value of this TTL.

One can proceed in a similar manner for path C2 and path C3, to obtain the results given in Table 1 below. For example, for path C2, the sum of the successive scores of the nodes visited by C2, divided by the total number of nodes, is equal to I1(C2)=2/3=1, which amounts to assigning to path C2 a reputation measurement equal to 66%.

TABLE 1

| Path | I1 |
| --- | --- |
| C1 | 4/4 = 100% |
| C2 | 2/3 = 66% |
| C3 | 3/3 = 100% |

The closer the number of routers SDS visited by a path is to the calculated TTL value, the more reliable the path can be considered to be.

Similarly, an estimate of a second trust index I2 can be performed to measure a reputation for a given node of the network R.

To do so, and following a principle similar to that described for the calculation of the first trust index I1, the controller CTRL determines all the paths passing through the given node of the network R. The controller CTRL then sums the corresponding values of I1, this sum being weighted by the number of paths passing through this given intermediate node. This makes it possible to estimate a second trust index I2 specific to nodes.

For example, taking into account paths C1, C2, and C3, the second trust index I2 of node N5 can be estimated as being I2(N5)=I1(C1)/1=1, since here only path C1 visits node N5.

Following this same principle, with the two paths C2 and C3 passing through end node N6, the second trust index I2 of node N6, I2(N6), will be [I1(C2)+I1(C3)]/2=[2/3+3/3]/2=5/6, or 83%. One can thus deduce a reputation measurement for the nodes of the network R in accordance with Table 2 below.

TABLE 2

| Node | I2 |
| --- | --- |
| N1 | 1/1 = 100% |
| N2 | (1 + 1)/2 = 100% |
| N4 | 1/1 = 100% |
| N5 | 1/1 = 100% |
| N6 | (2/3 + 3/3)/2 = 83% |

Figure 5:
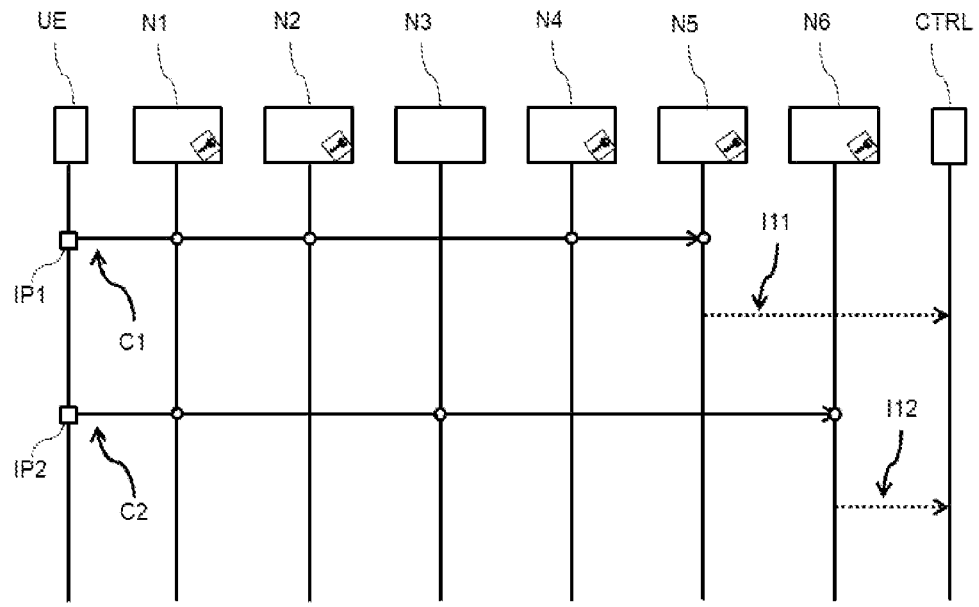
FIG. 5 represents a flow diagram for a data transmission following a first and a second path in a network.

FIG. 5 represents an exemplary diagram for the example transmissions of packets IP1 and IP2. Here, packet IP1 is considered to take path C1 and packet IP2 to take path C2.

For example, in this case, ingress node N1 assigns a TTL connection time value equal to 10 to packets IP1 and IP2.

This TTL value is decremented each time a packet passes through a node of the network R.

Packet IP1 taking path C1 therefore sees its TTL value decremented to 9 when it is received by N1. The TTL value is then decremented to 8, to 7, and finally to 6 when it is received by nodes N2, N4, and N5, respectively. The difference between the final and initial TTL value, equal to 10−6=4, thus provides an indication of the number of nodes visited by C1.

An update of the proof of transit comprised in IP1 is thus carried out at each passage through a router SDS.

For example, the proof of transit SDS corresponding to packet IP1 which takes path C1 will be modified by the controller CTRL and/or each of the routers SDS, corresponding here to nodes N1, N2, N4, and N5, in order to correspond successively to SDS(UE), SDS(UE,N1), SDS(UE, N1, N2), SDS(UE, N1, N2, N4), and SDS(UE, N1, N2, N4, N5).

These respective updates are preferably performed at the same time as the decrementing of the TTL value of the corresponding packet. In addition, and as described above, each node configured by the controller CTRL can calculate the value of this proof of transit SDS.

Following the configuration first step, and after the transmission of a packet, the collection second step is implemented by means of the controller CTRL. This step, which can also be implemented by a controller separate from the controller implementing the first step, involves collecting the values of the proof of transit and the TTL values for the transmission of a given packet.

In one embodiment, the controller CTRL and/or a network node is configured to determine a trust index of a path based on a ratio between a proof of transit value and a connection time value, called the SDS/TTL ratio.

Thus, upon receipt of packet IP1 by the end node N5, the controller CTRL collects the SDS/TTL ratio associated with it. This ratio defines an estimate of a first trust index I11, equal to SDS(UE, N1, N2, N4, N5, N6)/6, which provides a reputation measurement for path C1.

In a second example, packet IP2 travels path C2 and sees its TTL value decremented to 9 when it is received by node N1, then successively to 8 and to 7 when it is received by nodes N3 and N6.

The proof of transit SDS corresponding to packet IP2 traveling path C2 will correspond successively to SDS(UE), SDS(UE,N1), SDS(UE, N1, N3), and SDS(UE, N1, N3, N6).

Thus, upon receipt of packet IP2 by end node N6, the controller CTRL collects the SDS/TTL ratio associated with it. From this is deduced a value I12 equal to SDS(UE, N1, N3, N6)/7, different from I11, and providing a reputation measurement for path C2.

By doing the same for a series of different packets and/or paths, the collected reputation measurements can be used to construct a trust data matrix for the paths and/or nodes of the network R.

The embodiments described herein thus provide a method which makes it possible, for example, to determine the number of nodes that have not altered the proof of transit SDS.

Advantageously, an intermediate node or an end node can itself detect a possible deviation of the value of the SDS/TTL ratio before receiving a packet on an end node or on a server connected to the network.

For example, the embodiments described herein allow a router SDS in the network to detect the presence of a transit error of a given IP packet before it reaches an egress end node of the network. In particular, a router SDS can detect such an error by calculating the SDS/TTL ratio before the packet arrives at an end node, since this ratio provides information concerning the relative location of the packet in the network R. A node not configured to compute a proof of transit SDS would not be able to do so.

The detection of an SDS/TTL ratio error can therefore be performed by a specific node, which improves the reputation measurement within a network.

In one embodiment, one can design a device connectable to a node of a network, for example a user device or a server, which is configured to query any node of the network in order to determine its reputation, and for example a given SDS/TTL ratio.

In general terms, this disclosure also relates to an information medium readable by a computer system, possibly completely or partially removable, in particular a magnetic medium such as a hard drive, or a transmissible medium, such as an electrical or optical signal, comprising instructions of a computer program enabling implementation of a method for reputation measurement as mentioned above.

Furthermore, this disclosure also relates to a network controller device, and in particular a controller CTRL configured to implement all or part of the embodiments described above.

Figure 6:
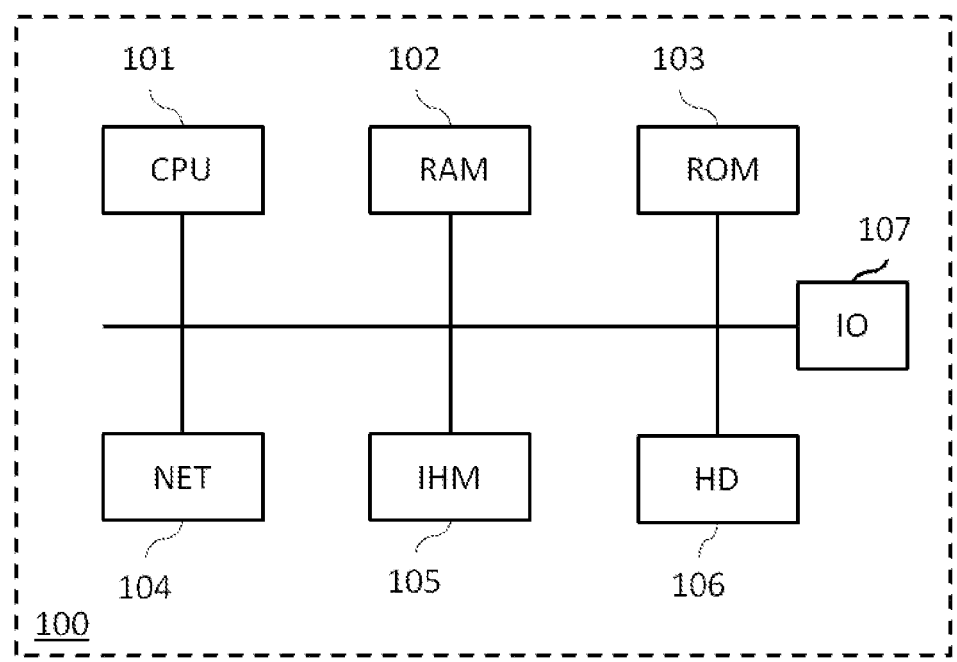
FIG. 6 represents a schematic block diagram of a processing circuit according to one exemplary embodiment.

Thus, FIG. 6 schematically represents a block diagram of a computer processing circuit 100. In the present case, the processing circuit 100 is integrated in a network controller device CTRL, this processing circuit being configured to implement a method according to the embodiments described above.

Alternatively, a circuit similar to processing circuit 100 can be integrated into the architecture of a node of a network R in order to implement the embodiments described above.

In one embodiment, the controller CTRL, or a network node, comprises a conventional computer architecture. It comprises in particular a communication bus connected, for example, to a central processing unit 101, such as a microprocessor, denoted CPU. The circuit 100 also comprises a random access memory 102, denoted RAM, for storing the executable code of a method for reputation measurement according to the embodiments described above, as well as the registers suitable for storing the variables and parameters necessary for implementing the method according to some embodiments. Its memory capacity can be supplemented by optional RAM memory connected to an expansion port, for example.

In addition, the computer processing circuit 100 comprises a read-only memory 103, denoted ROM, for storing computer programs for implementing the embodiments described above, as well as a network interface 104 which is normally connected to a communication network over which digital data to be processed are transmitted or received. The network interface 104 may be a single network interface, or may be composed of a set of different network interfaces (for example wired and wireless, interfaces or different types of wired or wireless interfaces). When data packets arrive on the network interface during a transmission, or when data packets are read by the network interface for verification, a software application and/or a computer program can be executed in the processor 101 to implement a method for reputation measurement as described above.

In one embodiment, the computer processing circuit 100 comprises a user interface 105 for receiving inputs from a user or for displaying information to a user, an optional storage medium 106 denoted HD, and an input/output module 107 denoted 10, for receiving, sending data from or to external devices such as a hard disk, removable storage medium, or other devices.

In one embodiment, the executable code can be stored in a read-only memory 103, on the storage medium 106 or on a digital removable medium such as a disk for example. In a variant, the executable code of the programs can be received by means of a communication network, via the network interface 104, in order to be stored in the storage medium 106, before being executed.

The central processing unit 101 is suitable for controlling and directing the execution of the instructions or portions of software code of the program or programs according to one of the embodiments described, these instructions being stored in one of the abovementioned storage means. After powering up, the CPU 101 is capable of executing instructions stored in the main RAM memory 102, relating to a software application, after these instructions have been loaded from ROM for example.

In one embodiment, the controller CTRL is programmable and can use software. Alternatively, however, this invention may be implemented in any hardware, for example directly in the circuit 100 or as a specific type of integrated circuit, or ASIC.

The invention claimed is:

1. A method for measuring reputation of paths visiting nodes in a communication network, the method being implemented by at least one device of the network and comprising, for each node visited by a current path of the network:
assigning a security score for this node, wherein the security score comprises at least a proof of transit, and estimating a first trust index based on:
a cumulative on said current path of the successive scores of the nodes visited by the current path, and
a count of nodes visited by the current path,
wherein:
said count of nodes is deduced from a value from a function selected among a function of at least one connection time value of a packet exchanged on the current path, and/or a function of a count of encapsulations of a packet exchanged on the current path; and
the estimation of said first trust index providing a reputation measurement for the current path.

2. The method according to claim 1, wherein said count of nodes is deduced further from a value from a function of at least one field of a packet exchanged on the current path.

3. The method according to claim 2, wherein said function comprises a calculation based on a predetermined value of a field of a packet and a current value.

4. The method according to claim 1, further comprising, for an intermediate node of the network visited by at least one path: c) estimating a second trust index based on a summation of at least a first trust index, said summation being weighted by the count of paths visiting said intermediate node.

5. The method according to claim 1, wherein the security score of a node is determined based on a prior installation of a computer security application at this node.

6. The method according to claim 1, wherein the estimation of the first trust index is implemented upon receipt of a packet by a node of the network to which a score has been assigned.

7. The method according to claim 1, further comprising transmitting a message comprising said reputation measurement, to a node of the network and/or to another device connected to a node of the network.

8. The method according to claim 1, further comprising selecting, in the network, a path between two end nodes, based on a better reputation among the reputations respectively estimated for a plurality of current paths in the network.

9. The method according to claim 1, wherein the current path visits two end nodes of the network, among which are a first end node connected to a user device and a second end node connected to a server.

10. The method according to claim 1, wherein the device of the network is a network controller device.

11. The method according to claim 1, implemented by a plurality of separate network controllers.

12. The method according to claim 1, further comprising receiving by the at least one device a data packet from another node of the network, and wherein assigning the security score for the node visited by the current path is performed by the node visited by the current path while receiving the data packet from the other node of the network.

13. The method according to claim 1, wherein estimating the first trust index is performed by a controller of said network after receiving security scores from at least one of the nodes of the network.

14. A network controller device comprising:
a processing circuit configured to measure reputation of paths visiting nodes in a communication network by, for each node visited by a current path of the network:
assigning a security score for this node, wherein the security score comprises at least a proof of transit, and estimating a first trust index based on:
a cumulative on said current path of the successive scores of the nodes visited by the current path, and
a count of nodes visited by the current path,
wherein:
said count of nodes is deduced from a value from a function selected among a function of at least one connection time value of a packet exchanged on the current path, and/or a function of a count of encapsulations of a packet exchanged on the current path; and
the estimation of said first trust index providing a reputation measurement for the current path.

15. A non-transitory computer-readable medium comprising instructions stored thereon for measuring reputation of paths visiting nodes in a communication network, when said instructions are executed by a processor of a processing circuit of a device of the network, wherein the instructions cause the device to measure the reputation by, for each node visited by a current path of the network:
assigning a security score for this node, wherein the security score comprises at least a proof of transit, and estimating a first trust index based on:
a cumulative on said current path of the successive scores of the nodes visited by the current path, and
a number ofcount of nodes visited by the current path,
wherein:
said count of nodes is deduced from a value from a function selected among a function of at least one connection time value of a packet exchanged on the current path, and/or a function of a count of encapsulations of a packet exchanged on the current path; and
the estimation of said first trust index providing a reputation measurement for the current path.

\* \* \* \* \*